US012221530B2

(12) United States Patent
Kaarto et al.

(10) Patent No.: US 12,221,530 B2
(45) Date of Patent: Feb. 11, 2025

(54) POLYPROPYLENE COPOLYMER COMPOSITION HAVING SUBZERO IMPACT RESISTANCE

(71) Applicant: W. R. Grace & Co.-Conn., Columbia, MD (US)

(72) Inventors: John Kalevi Kaarto, Columbia, MD (US); Jing Zhong, Columbia, MD (US); Amaia Montoya-Goni, Columbia, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 469 days.

(21) Appl. No.: 17/594,140

(22) PCT Filed: Apr. 3, 2020

(86) PCT No.: PCT/US2020/026542
§ 371 (c)(1),
(2) Date: Oct. 4, 2021

(87) PCT Pub. No.: WO2020/206225
PCT Pub. Date: Oct. 8, 2020

(65) Prior Publication Data
US 2022/0169843 A1    Jun. 2, 2022

Related U.S. Application Data

(60) Provisional application No. 62/829,932, filed on Apr. 5, 2019.

(51) Int. Cl.
*C08L 23/10* (2006.01)
(52) U.S. Cl.
CPC ........... *C08L 23/10* (2013.01); *C08L 2201/10* (2013.01); *C08L 2205/025* (2013.01)
(58) Field of Classification Search
CPC ..................................................... C08L 23/10
USPC ....................................................... 523/201
See application file for complete search history.

(56) References Cited

U.S. PATENT DOCUMENTS

| | | | |
|---|---|---|---|
| 4,634,740 A | 1/1987 | Fujita et al. | |
| 4,882,380 A | 11/1989 | Ficker et al. | |
| 6,015,854 A | 1/2000 | McCullough, Jr. | |
| 6,197,886 B1 | 3/2001 | Chatterjee et al. | |
| 8,835,568 B2 | 9/2014 | Ciarafoni et al. | |
| 9,738,761 B2* | 8/2017 | Hallot | .................. C08K 5/0083 |
| 2006/0258811 A1 | 11/2006 | Barcus et al. | |
| 2007/0167576 A1 | 7/2007 | Kim et al. | |
| 2010/0152382 A1 | 8/2010 | Jiang et al. | |
| 2011/0196101 A1 | 8/2011 | Jiang et al. | |
| 2012/0288656 A1 | 11/2012 | Doufas | |
| 2015/0322215 A1* | 11/2015 | Hallot | .................. C08K 5/0083 |
| | | | 524/397 |
| 2016/0040000 A1 | 2/2016 | Dias et al. | |

FOREIGN PATENT DOCUMENTS

| | | |
|---|---|---|
| EP | 2 338 656 A1 | 6/2011 |
| EP | 2 492 310 A1 | 8/2012 |
| JP | 04-351616 A | 12/1992 |
| JP | 05-331327 A | 12/1993 |
| JP | 09-003294 A | 1/1997 |
| JP | 2010515810 A | 5/2010 |
| JP | 2010523809 A | 7/2010 |
| JP | 2012-514123 T | 6/2012 |
| JP | 2013-525581 A | 6/2013 |
| RU | 2510407 C2 | 3/2014 |
| WO | WO 2014/160311 | 10/2014 |
| WO | WO 2016/000910 | 1/2016 |

OTHER PUBLICATIONS

EESR on EP patent application No. 20782278.4 dated Nov. 15, 2022 (6 pages).
Foreign Office Action and ISR on RU patent application No. 2021128477 dated Sep. 12, 2023 (23 pages).
Foreign Office Action on JP patent application No. 2021-559082 dated Apr. 17, 2024 (14 pages).
Office Action from JP 2021-559082, mailed on Dec. 11, 2024, 6 pages.

* cited by examiner

*Primary Examiner* — Deve V Hall
(74) *Attorney, Agent, or Firm* — DORITY & MANNING, P.A.

(57) ABSTRACT

Polypropylene polymer compositions are disclosed that can be formulated to have excellent clarity properties in conjunction with excellent impact resistance properties at subzero temperatures. The polypropylene polymer compositions are heterophasic compositions containing a first phase polymer combined with a second phase polymer. The first phase polymer is a polypropylene and alpha-olefin copolymer while the second phase polymer is also a polypropylene and alpha-olefin random copolymer. The second phase polymer contains relatively high amounts of ethylene. The increased amounts of ethylene in the second phase polymer were found to dramatically improve impact resistance at subzero temperatures.

20 Claims, 1 Drawing Sheet

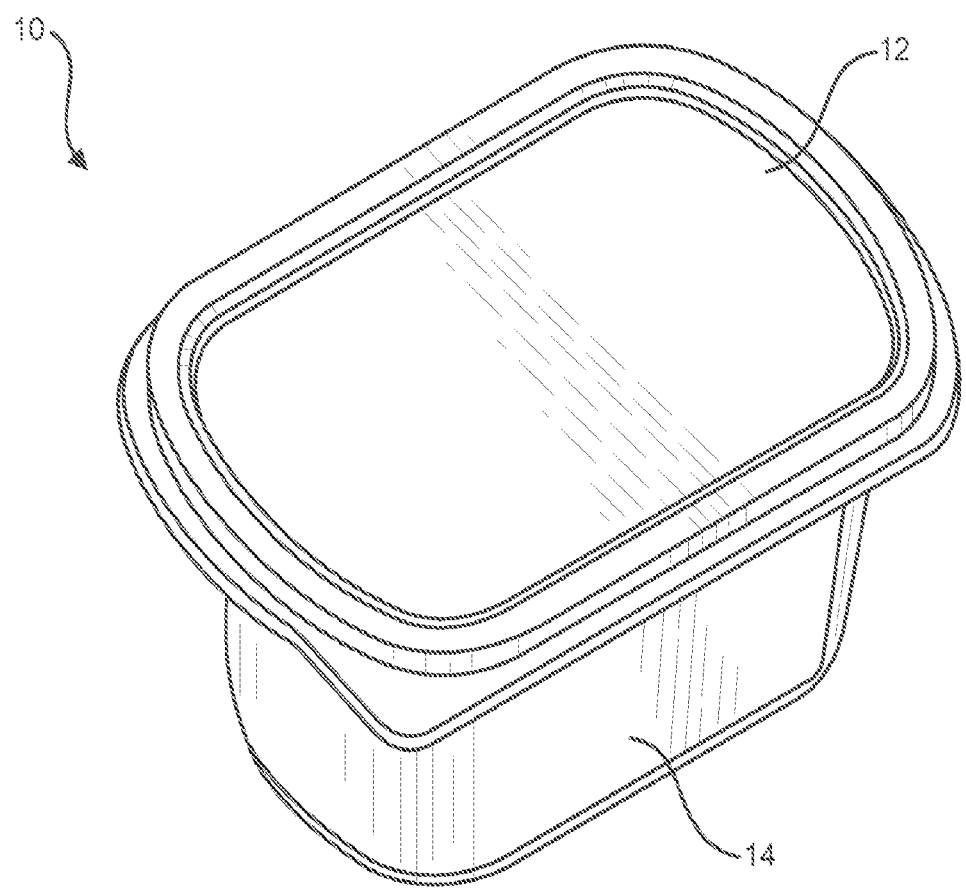

POLYPROPYLENE COPOLYMER COMPOSITION HAVING SUBZERO IMPACT RESISTANCE

RELATED APPLICATIONS

The present application is based on and claims priority to U.S. Provisional Patent application Ser. No. 62/829,932, filed on Apr. 5, 2019, which is incorporated herein by reference.

BACKGROUND

Transparency and impact resistance are highly desired properties for many polymer applications. For example, polymers can be used to produce various different products such as packaging or containers where transparency can be very beneficial to the user. In many situations, for instance, it is highly advantageous to view the contents of the packaging or the container through the walls of the packaging or the container. High impact resistance properties, on the other hand, make the containers durable.

One type of polymer that can be made highly transparent are semi-crystalline polypropylene homopolymers. Polypropylene homopolymers are generally very translucent due to a high crystallinity and large spherulites. The transparency of polypropylene polymers can be improved by incorporating ethylene or another alpha-olefin into the polymer chain to generate a polypropylene random copolymer. Nucleators and/or clarifiers can also be incorporated into the polymer to further decrease the crystal size and increase the clarity.

Although polypropylene random copolymers have excellent transparency properties, the polymers have a tendency to have relatively low impact resistance, especially in subzero environments. Thus, for refrigerator or freezer storage containers and/or for long term storage containers, greater impact resistance is needed. When attempts are made to increase the impact resistance of polypropylene polymers, however, other properties of the polymers can be degraded.

In the past, polypropylene impact copolymers have been designed that include a homopolymer matrix blended with a rubber-like propylene-alpha-olefin copolymer phase. The copolymer phase is intended to increase impact resistance, such as at cold temperatures. The propylene-alpha-olefin copolymer can be mostly amorphous and thus have elastomeric properties forming a rubber phase within the polymer composition. The incorporation of the propylene-alpha-olefin copolymer does improve the impact resistance but sacrifices the clarity.

In order to improve the transparency of heterophasic polypropylene compositions containing a rubber phase, those skilled in the art have attempted to reduce the rubber phase size. For instance, adding ethylene to the matrix polymer and minimizing the ethylene content in the rubber phase can be used to improve compatibility between the matrix phase and the rubber phase. Past attempts, however, have failed to adequately provide a polymer composition having a desired blend of transparency and impact strength. More particularly, past attempts have failed to produce a polypropylene polymer composition having adequate impact resistance at subzero temperatures.

SUMMARY

In general, the present disclosure is directed to a polypropylene polymer composition having an improved balance of properties. Polypropylene polymer compositions made in accordance with the present disclosure, for instance, can be formulated to have excellent clarity properties in combination with excellent subzero impact resistance properties. In one embodiment, the polypropylene polymer composition includes a polypropylene polymer combined with a propylene and alpha olefin copolymer containing relatively high amounts of alpha olefin. The alpha olefin (such as ethylene) content of each polymer phase can be controlled within desired limits. In addition, the relative amounts of each polymer phase can be selected so as to maximize certain properties. In one embodiment, the polymers that are blended together are both made using a Ziegler-Natta catalyst system that can enable careful control over the different parameters and variables during polymer processing.

In one embodiment, for instance, the present disclosure is directed to a polypropylene composition including a first polymer phase combined or blended with a second polymer phase. The first polymer phase comprises a polypropylene polymer, such as a polypropylene random copolymer. The polypropylene random copolymer can contain an alpha olefin such as ethylene or butylene in an amount up to about 4% by weight, such as in an amount from about 1% to about 4% by weight. The polypropylene random copolymer can have a xylene soluble fraction of less than about 10%, such as less than about 8% by weight. The polypropylene random copolymer is generally present in the polymer composition in an amount greater than about 50% by weight, such as in an amount greater than about 60% by weight, such as in an amount greater than about 65% by weight. The first polymer phase can have a melt flow rate of generally from about 20 g/10 min to about 50 g/10 min.

The second polymer phase blended with the first polymer phase generally comprises a propylene and alpha olefin copolymer such as a propylene ethylene copolymer, containing relatively high amounts of alpha olefin, such as ethylene. It was discovered that increasing the ethylene amount in the elastomeric or rubber-like copolymer can dramatically and unexpectedly improve the impact resistant properties of the polymer composition at subzero temperatures, such as at temperatures less than 0° C., such as at a temperature of −20° C. The amount of ethylene contained in the copolymer can be characterized by the amount of ethylene in the xylene soluble portion and the amount of ethylene in the xylene insoluble portion of the polypropylene composition. For example, the polypropylene composition (both the first polymer phase and the second polymer phase) can have a total xylene soluble content of from about 12% to about 25% by weight. The xylene soluble portion can contain ethylene in an amount from about 55% by weight to about 70% by weight, such as from about 60% by weight to about 70% by weight. Ethylene can be contained in the xylene insoluble portion in an amount from about 15% by weight to about 40% by weight, such as in an amount from about 20% by weight to about 38% by weight. In this regard, the propylene ethylene copolymer in the second polymer phase generally contains ethylene in an amount greater than about 75% by weight, such as in an amount greater than about 80% by weight, and generally in an amount less than about 95% by weight, such as in an amount less than about 92% by weight. In one embodiment, ethylene is contained in the second polymer phase in an amount from about 75% by weight to about 85% by weight, such as from about 77% by weight to about 83% by weight.

The above heterophasic polypropylene composition has an excellent blend of physical properties. For instance, when tested at −20° C., the polypropylene composition can have a Gardner impact strength of greater than about 200 inch-lbs, such as greater than about 250 inch-lbs, such as greater than about 300 inch-lbs, such as greater than about 350 inch-lbs, and generally less than about 500 inch-lbs. In addition, the polypropylene composition can have a flexural modulus of less than about 1000 MPa, such as less than about 800 MPa, and generally greater than about 500 MPa, such as greater than about 650 MPa. In addition, the polypropylene composition can have a haze at 1 mm of less than about 45%. For example, the haze can be from about 5% to about 45%. In addition, the polypropylene composition can have relatively high clarity. For example, the clarity of the composition can be greater than about 90%, such as greater than about 92%.

The polypropylene composition can generally have a melt flow rate of greater than about 3 g/10 min, such as greater than about 5 g/10 min, such as greater than about 10 g/10 min, and generally less than about 50 g/10 min. In one embodiment, the melt flow rate can be from about 15 g/10 min to about 25 g/10 min. The ratio of the melt flow rate of the first polymer phase to the melt flow rate of the polypropylene composition is generally greater than or equal to 1. The second polymer phase is contained in the polypropylene composition generally in an amount from about 15% to about 50% by weight. In one embodiment, the composition can further include a clarifier for improving transparency properties.

The polymer composition of the present disclosure can be used to make numerous and different types of products. In one embodiment, the polymer composition can be used to form various different molded articles, such as injection molded articles. In one embodiment, the polymer composition can be used to form containers, such as storage containers. The storage containers, for instance, can be configured to hold a food item or can be used to form long term storage containers for warehouses, attics, garages, and the like. The polymer composition of the present disclosure is particularly well suited for producing storage containers and other packaging for freezer applications or for applications where the container is to be exposed to subzero temperatures.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is a perspective view of one embodiment of a container made in accordance with the present disclosure.

Repeat use of reference characters in the present specification and drawings is intended to represent the same or analogous features or elements of the present invention.

DEFINITIONS AND TESTING PROCEDURES

The term "propylene-ethylene copolymer", as used herein, is a copolymer containing a majority weight percent propylene monomer with ethylene monomer as a secondary constituent. A "propylene-ethylene copolymer" (also sometimes referred to as a polypropylene random copolymer, PPR, PP-R, RCP or RACO) is a polymer having individual repeating units of the ethylene monomer present in a random or statistical distribution in the polymer chain.

Melt flow rate (MFR), as used herein, is measured in accordance with the ASTM D 1238 test method at 230° C. with a 2.16 kg weight for propylene-based polymers.

Xylene solubles (XS) is defined as the weight percent of resin that remains in solution after a sample of polypropylene random copolymer resin is dissolved in hot xylene and the solution is allowed to cool to 25° C. This is also referred to as the gravimetric XS method according to ASTM D5492-06 using a 90 minute precipitation time and is also referred to herein as the "wet method". XS can also be measured according to the Viscotek method, as follows: 0.4 g of polymer is dissolved in 20 ml of xylenes with stirring at 130° C. for 60 minutes. The solution is then cooled to 25° C. and after 60 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min. The column is coupled to a Viscotek Model 302 Triple Detector Array; with light scattering, viscometer and refractometer detectors operating at 45° C. Instrument calibration is maintained with Viscotek PolyCAL™ polystyrene standards. A polypropylene (PP) homopolymer, such as biaxially oriented polypropylene (BOPP) grade Dow 5D98, is used as a reference material to ensure that the Viscotek instrument and sample preparation procedures provide consistent results by using 5D98 as a control to check method performance. The value for 5D98 is initially derived from testing using the ASTM method identified above.

The ASTM D5492-06 method mentioned above may be adapted to determine the xylene soluble portion. In general, the procedure consists of weighing 2 g of sample and dissolving the sample in 200 ml o-xylene in a 400 ml flask with 24/40 joint. The flask is connected to a water cooled condenser and the contents are stirred and heated to reflux under nitrogen ($N_2$), and then maintained at reflux for an additional 30 minutes. The solution is then cooled in a temperature controlled water bath at 25° C. for 90 minutes to allow the crystallization of the xylene insoluble fraction. Once the solution is cooled and the insoluble fraction precipitates from the solution, the separation of the xylene soluble portion (XS) from the xylene insoluble portion (X) is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. The xylene soluble portion is calculated as XS (wt %)=$[(m_3-m_2)*2/m_1]*100$, where $m_1$ is the original weight of the sample used, $m_2$ is the weight of empty aluminum pan, and $m_3$ is the weight of the pan and residue (the asterisk, *, here and elsewhere in the disclosure indicates that the identified terms or values are multiplied).

The ethylene content of the xylene soluble (XS) portion and the xylene insoluble (XI) are measured by $^{13}C$-NMR. The samples are prepared by adding approximately 2.7 g of a 50/50 mixture of tetrachloroethane-d2/orthodichlorobenzene containing 0.025 M Cr(AcAc)3 to 0.20 g sample in a Norell 1001-7 10 mm NMR tube. The samples are dissolved and homogenized by heating the tube and its contents to 150° C. using a heating block. Each sample is visually inspected to ensure homogeneity. The data are collected using a Bruker 400 MHz spectrometer equipped with a Bruker Dual DUL high-temperature CryoProbe. The data are acquired using 500 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 10 minutes prior to data acquisition.

Ethylene content was calculated based on the triads distribution. The assignment of chemical shift of triads is shown in Table 1.

$$PPP=(F+A-0.5D)/2$$

$$PPE=D$$

$$EPE=C$$

$$EEE=(E-0.5G)/2$$

$$PEE=G$$

$$PEP=H$$

The ethylene content is based on the following calculations:

mols $P$=sum $P$ centered triads mols $E$=sum $E$ centered triads

TABLE 1

Assignment of chemical shift to triad for ethylene propylene copolymer

| | Chem.l shift δ (ppm) | Triad | Carbon type | Chem. shift range | Region |
|---|---|---|---|---|---|
| 1 | 44-49 | PPE | $CH_2$ | 44.0-49.0 | A |
| 2 | | PPP | $CH_2$ | | |
| 3 | 37.8 | EPE(P) | $CH_2$ | 36.0-39.0 | B |
| 4 | 37.4 | EPE(E) | $CH_2$ | | |
| 5 | 33.2 | EPE | CH | 32.8-34.0 | C |
| 6 | 31.0 | PPE | CH | 31.00 | D |
| 7 | 30.8 | PEE(P) | $CH_2$ | 29.7-30.8 | E |
| 8 | 30.4 | PEE(E) | $CH_2$ | | |
| 9 | 30.0 | EEE | $CH_2$ | | |
| 10 | 28.8 | PPP | CH | 28.0-29.7 | F |
| 11 | 27.3 | EEP | $CH_2$ | 26.0-28.3 | G |
| 12 | 24.6 | PEP | $CH_2$ | 24.0-26.0 | H |
| 13 | 21.6 | PPP | $CH_3$ | 19.0-23.0 | I |
| 14 | 20.8 | PPE | $CH_3$ | | |
| 15 | 20.0 | EPE | $CH_3$ | | |

The Koenig B value which is a measure of randomness or blockiness in a copolymer is calculated by: Koenig B=[EP]/(2[P][E]), where [EP] is the total mole fraction of EP dimers (EP+PE). (Spectroscopy of Polymers" 2nd edition, Jack L. Koenig, 1999, Elsevier; pp 17-18).

Flexural modulus is determined in accordance with ASTM D790-10 Method A at 1.3 mm/min, using a Type 1 specimen per ASTM 3641 and molded according to ASTM D4101.

Mw/Mn (also referred to as "MWD") and Mz/Mw are measured by GPC according to the Gel Permeation Chromatography (GPC) Analytical Method for Polypropylene. The polymers are analyzed on a PL-220 series high temperature gel permeation chromatography (GPC) unit equipped with a refractometer detector and four PLgel Mixed A (20 μm) columns (Polymer Laboratory Inc.). The oven temperature is set at 150° C. and the temperatures of autosampler's hot and the warm zones are at 135° C. and 130° C. respectively. The solvent is nitrogen purged 1,2,4-trichlorobenzene (TCB) containing ~200 ppm 2,6-di-t-butyl-4-methylphenol (BHT). The flow rate is 1.0 mL/min and the injection volume was 200 μl. A 2 mg/mL sample concentration is prepared by dissolving the sample in N2 purged and preheated TCB (containing 200 ppm BHT) for 2.5 hrs at 160° C. with gentle agitation.

The GPC column set is calibrated by running twenty narrow molecular weight distribution polystyrene standards. The molecular weight (MW) of the standards ranges from 580 to 8,400,000 g/mol, and the standards were contained in 6 "cocktail" mixtures. Each standard mixture has at least a decade of separation between individual molecular weights. The polystyrene standards are prepared at 0.005 g in 20 mL of solvent for molecular weights equal to or greater than 1,000,000 g/mol and 0.001 g in 20 mL of solvent for molecular weights less than 1,000000 g/mol. The polystyrene standards are dissolved at 150° C. for 30 min under stirring. The narrow standards mixtures are run first and in order of decreasing highest molecular weight component to minimize degradation effect. A logarithmic molecular weight calibration is generated using a fourth-order polynomial fit as a function of elution volume. The equivalent polypropylene molecular weights are calculated by using following equation with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Heilman, P. M. Muglia, Macromolecules, 4, 507 (1971)):

$$M_{PP} = \left(\frac{K_{PS} M_{PS}^{a_{PS}+1}}{K_{PP}}\right)^{\frac{3}{a_{PP}-1}}$$

where $M_{pp}$ is PP equivalent MW, $M_{PS}$ is PS equivalent MW, log K and a values of Mark-Houwink coefficients for PP and PS are listed below in Table 2.

TABLE 2

| Polymer | A | Log K |
|---|---|---|
| Polypropylene | 0.725 | −3.721 |
| Polystyrene | 0.702 | −3.900 |

IZOD impact strength is measured in accordance with ASTM D 256.

Gardner Impact Testing is measured in accordance with ASTM D5420.

Haze and clarity are measured in accordance with ASTM Test D1003 Procedure A and D1746 using BYK Gardner Haze-Gard Plus 4725 using an injection molded plaque having a thickness of 1 mm.

Tan δ is measured by DMA test using a TA instrument Q800 with dual cantilever fixture. The specimen is cut from the flexural modulus specimen with dimension of 12.7 mm*3.2 mm*60 mm. The samples are firstly equilibrated at −150° C. and isothermal for 5 mins then heated up to 100° C. with heating rate of 3° C./min.

The term β/α relates to the ratio of the molecular weight of the copolymer of the discontinuous phase to the molecular weight of the propylene-based polymer of the continuous phase where β and α are the values of the intrinsic viscosity of the copolymer and propylene-based polymer fractions, respectively, as measured in decalin at 135° C. (ASTM D 1601). For the purposes of this disclosure, the value of β/α is calculated from the MFR of the matrix polymer, the MFR of the whole impact copolymer and Fc before visbreaking, as follows:

$$B/\alpha = 1 + \frac{(MFR_{matrix}/MFR_{whole})0.213 - 1}{Fc}$$

The rubber particle size is measured by a scanning electronic microscope (SEM) machine Hitachi Tabletop Microscope TM3030Plus. The sample is firstly cut from the center of the IZOD testing bards (ASTM D4101) along the flow direction, and then cryo-microtomed at −20° C. and stained with $RuO_4$ and further cryo-microtomed at −20° C. The SEM images are observed under backscattering (BSE) mode where the highly stained region (EPR rubber) is the lighter phase and the slightly stained region is the darker phase. The particle size is captured and analyzed by the software of Image-Pro® Premier. D50 is calculated with the meaning of the particle size at 50% accumulative volume fraction.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polypropylene composition having a unique blend of physical properties. For instance, in one embodiment, the polymer composition can be formulated so as to have not only excellent transparency characteristics, but also excellent impact resistance properties. In addition, the polymer composition can be formulated to have good flow characteristics. Thus, the polymer composition is particularly well suited to forming injection molded articles. In one embodiment, for instance, the polymer composition can be used to form containers, particularly storage containers in which the product or item placed in the container can be viewed through the walls of the container or package. The polypropylene composition of the present disclosure is particularly well suited to producing freezer packages and containers.

In general, the polypropylene composition of the present disclosure comprises a heterophasic composition. In particular, the polypropylene composition includes a first polymer phase blended with a second polymer phase. Both polymer phases are formed from a polypropylene copolymer containing controlled amounts of an alpha-olefin, such as ethylene or butylene. For example, in one embodiment, the first polymer phase comprises a polypropylene random copolymer containing ethylene in an amount up to about 4% by weight. The first polymer phase is generally present in the polymer composition in an amount greater than the second polymer phase and therefore forms a matrix polymer. The second polymer phase, on the other hand, comprises a polypropylene copolymer having elastomeric or rubber-like properties. In accordance with the present disclosure, the second polymer phase contains greater amounts of ethylene than propylene. It was discovered that substantially increasing ethylene levels in the second polymer phase can dramatically improved the impact resistant properties of the polymer composition at subzero temperatures. The unexpectedly improved toughness properties at lower temperatures in combination with excellent clarity properties makes the polypropylene composition well suited to producing containers that are to be used in low temperature environments.

For example, when tested according to the Gardner impact test, the polymer composition can display a Gardner impact resistance at −20° C. of greater than about 200 inch-lbs, such as greater than about 225 inch-lbs, such as greater than about 250 inch-lbs, such as greater than about 275 inch-lbs, such as greater than about 300 inch-lbs, such as greater than about 325 inch-lbs, and generally less than about 500 inch lbs.

As described above, in addition to excellent impact strength properties, the polymer composition of the present disclosure can also have very good transparency properties. For instance, the polymer composition can have a haze at 1 mm of less than about 45%, such as less than about 40%, such as less than about 35%, such as even less than about 30%. The haze at 1 mm is generally greater than about 10%.

In addition to relatively low haze, the polypropylene composition of the present disclosure can display excellent clarity characteristics. For instance, the polymer composition can exhibit a clarity of greater than about 80%, such as greater than about 85%, such as greater than about 90%, such as greater than about 92%.

The flexible nature of the polymer composition can vary depending upon various factors including the relative amounts of the first polymer phase and the second polymer phase and the amount of comonomer in the first and second phases. In general, the polymer composition of the general disclosure can have a flexural modulus of less than about 1000 MPa, such as less than about 850 MPa, such as less than about 800 MPa, such as less than about 750 MPa. In general, the flexural modulus is greater than about 500 MPa, such as greater than about 550 MPa, such as greater than about 600 MPa.

The term β/α relates to the ratio of the molecular weight of the copolymer to the molecular weight of the matrix polymer or the polymer of the first polymer phase. The molecular weight of each polymer is proportional to the intrinsic viscosity of each polymer. The intrinsic viscosity indicates the viscosity of a solution of the polymer in a given solvent and at a given temperature. The polymer composition of the present disclosure can have a β/α ratio of greater than about 1, such as greater than or equal to 1.1. For example, the β/α ratio can be greater than about 1.2, such as greater than about 1.3. In general, the β/α ratio is less than about 2, such as less than about 1.8, such as less than about 1.6.

Polymer compositions formulated in accordance with the present disclosure can also have excellent flow properties while retaining relatively high impact strength. For example, the polymer composition of the present disclosure can have a melt flow rate of greater than about 3 g/10 min, such as greater than about 15 g/10 mins, such as greater than about 17 g/10 mins, such as greater than about 18 g/10 mins. The melt flow rate is generally less than about 80 g/10 mins, such as less than about 70 g/10 mins, such as less than about 50 g/10 mins, such as less than about 35 g/10 mins, such as less than about 30 g/10 mins. The above flow properties make the polymer composition well suited for use in injection molding applications.

As described above, the polypropylene composition of the present disclosure generally includes a first phase polymer combined with a second phase polymer. The first phase polymer comprises a polypropylene polymer, such as a random copolymer of polypropylene. The random copolymer, for instance, can be a copolymer of propylene and an alpha-olefin, such as ethylene or butylene. The polypropylene random copolymer forms the matrix polymer in the polypropylene composition and can contain the alpha-olefin in an amount up to about 4% by weight, such as in an amount less than about 3.8% by weight, such as in an amount less than about 3.5% by weight, and generally in an amount greater than about 0.5% by weight, such as in an amount greater than about 1% by weight, such as in an amount greater than about 1.5% by weight, such as in an amount greater than about 2% by weight. The first phase polymer can have a xylene soluble content of generally less than about 12% by weight, such as in an amount less than about 10% by weight, such as in an amount less than about 8% by weight, such as in an amount less than about 7% by weight. The xylene soluble content is generally greater than about 0.5% by weight, such as greater than about 3% by weight.

As will be described in greater detail below, the first phase polymer can comprise a Ziegler-Natta catalyzed polymer and can have a relatively broad molecular weight distribution. For instance, the molecular weight distribution (Mw/Mn) greater than about 3.8, such as greater than about 4, such as greater than about 4.3, such as greater than about 4.5, such as greater than about 4.8, such as greater than about 5, such as greater than about 5.2, such as greater than about 5.5, such as greater than about 5.7, such as greater than about 6, and generally less than about 9, such as less than about 8.5, such as less than about 8. The weight average molecular weight (determined by GPC) of the first phase polymer is generally greater than about 100,000, such as greater than about 120,000.

The polypropylene random copolymer that makes up the first phase polymer, in one embodiment, has a relatively high melt flow rate. For instance, the first phase polymer can have a melt flow rate of greater than about 15 g/10 mins, such as greater than about 18 g/10 mins, such as greater than about 20 g/10 mins, such as greater than about 22 g/10 mins, such as greater than about 25 g/10 mins. The melt flow rate of the first phase polymer is generally less than about 80 g/10 mins, such as less than about 50 g/10 mins.

The second phase polymer is a propylene and alpha-olefin copolymer. In addition, the second phase polymer has elastomeric or rubber-like properties. Thus, the second phase polymer can dramatically improve the impact strength resistance of the polymer composition.

In accordance with the present disclosure, the second phase polymer contains relatively high amounts of an alpha-olefin in relation to the amount of propylene contained in the second polymer phase. For example, in one embodiment, the second phase polymer contains ethylene in amounts that are greater than the amount of propylene present. Increasing the ethylene content of the second polymer phase has been found to unexpectedly and dramatically improve the impact resistance properties of the polymer composition at subzero temperatures.

The amount of ethylene contained in the second polymer phase can be characterized or quantified by examining the amount of ethylene in the xylene solubles and in the xylene insolubles. For example, the polypropylene composition of the present disclosure can have a total xylene soluble content of generally greater than about 12% by weight, such as greater than about 15% by weight, such as greater than about 18% by weight, such as greater than about 20% by weight and generally less than about 40% by weight, such as less than about 30% by weight, such as less than about 25% by weight, such as less than about 21% by weight. Thus, the polypropylene composition includes a xylene soluble portion and a xylene insoluble portion. In accordance with the present disclosure, ethylene can be contained in the xylene soluble portion in an amount greater than about 55% by weight, such as in an amount greater than about 58% by weight, such as in an amount greater than about 60% by weight, and generally in an amount less than about 70% by weight, such as in an amount less than about 68% by weight. The amount of ethylene contained in the xylene insoluble portion, on the other hand, can generally be greater than about 15% by weight, such as greater than about 18% by weight, such as greater than about 20% by weight and generally less than about 50% by weight, such as less than about 40% by weight, such as less than about 38% by weight.

Based on the above ranges, it is believed that ethylene is contained in the second polymer phase in an amount greater than about 75% by weight, such as in an amount greater than about 80% by weight, such as in an amount greater than about 85% by weight, and generally in an amount less than about 95% by weight, such as in an amount less than about 90% by weight.

The second phase polymer can have a weight average molecular weight of at least about 130,000, such as at least about 140,000, such as at least about 150,000 and generally less than about 500,000.

The first phase polymer generally forms a matrix and the second phase polymer forms particles within the matrix. In the past, various efforts were made to reduce the size of the second phase polymer particles. In the polymer composition of the present disclosure, however, the second phase polymer particles have a relatively large size. It was unexpectedly discovered that excellent physical properties can be obtained including clarity and haze while still having relatively large second phase polymer particles. For instance, the second phase polymer particles can have an average particle size (D50) of greater than about 1 micron, such as greater than about 1.1 micron, and generally less than about 8 microns, such as less than about 6 microns, such as less than about 4 microns. The average particle size, for instance, can be greater than about 1.5 microns, such as greater than about 2 microns, such as greater than about 2.5 microns, such as even greater than 3 microns. The average particle size, for instance, in one embodiment, can be from about 1 micron to about 5 microns. In one embodiment, greater than 50% of the particles contained in the second phase polymer can be greater than about 2 microns, such as greater than about 3 microns, based on a volume fraction. For example, in one embodiment, 50% of the particles have a particle size of from about 3 microns to about 5 microns on a volume fraction.

The relative amounts of the different phases contained in the polymer composition can vary depending upon various factors and the desired result. In general, the second polymer phase can be contained in the polypropylene composition in an amount greater than about 15% by weight, such as in an amount greater than about 20% by weight, such as in an amount greater than about 25% by weight, such as in an amount greater than about 30% by weight, such as in an amount greater than about 35% by weight, and generally in an amount less than about 60% by weight, such as in an amount less than about 50% by weight, such as in an amount less than about 40% by weight, such as in an amount less than about 35% by weight. For example, the second phase polymer can be present in the composition in an amount greater than about 15% by weight and in an amount less than about 60% by weight including all increments of 1% by weight therebetween.

In addition to the first phase polymer and the second phase polymer, the polypropylene composition of the present disclosure can contain various other additives and ingredients. For instance, the polypropylene composition can contain nucleators, mold release agents, slip agents, antiblocks, UV stabilizers, heat stabilizer (e.g. DSTDP), colorants/tints, and the like. In one embodiment, the polymer composition can contain an antioxidant, such as a hindered phenolic antioxidant. The polymer composition can also contain an acid scavenger. Each of the additives can be present in the polymer composition generally in an amount less than about 3% by weight, such as in an amount less than about 2% by weight, such as in an amount less than about 1% by weight, such as in an amount less than about 0.5% by weight, and generally in an amount greater than about 0.001% by weight.

In one embodiment, the polypropylene composition can further contain a clarifying agent. The clarifying agent can be added to further improve the transparency properties of the composition. The clarifying agent, for instance, can comprise a compound capable of producing a gelation network within the composition.

In one embodiment, the clarifying agent may comprise a sorbitol compound, such as a sorbitol acetal derivative. In one embodiment, for instance, the clarifying agent may comprise a dibenzyl sorbitol.

With regard to sorbitol acetal derivatives that can be used as an additive in some embodiments, the sorbitol acetal derivative is shown in Formula (I):

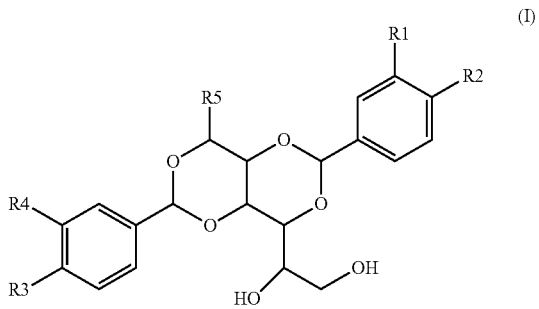

wherein R1-R5 comprise the same or different moieties chosen from hydrogen and a C1-C3 alkyl.

In some embodiments, R1-R5 are hydrogen, such that the sorbitol acetal derivative is 2,4-dibenzylidene sorbitol ("DBS"). In some embodiments, R1, R4, and R5 are hydrogen, and R2 and R3 are methyl groups, such that the sorbitol acetal derivative is 1,3:2,4-di-p-methyldibenzylidene-D-sorbitol ("MDBS"). In some embodiments, R1-R4 are methyl groups and R5 is hydrogen, such that the sorbitol acetal derivative is 1,3:2,4-Bis (3,4-dimethylobenzylideno) sorbitol ("DMDBS"). In some embodiments, R2, R3, and R5 are propyl groups (—CH2-CH2-CH3), and R1 and R4 are hydrogen, such that the sorbitol acetal derivative is 1,2,3-trideoxy-4,6:5,7-bis-O-(4-propylphenyl methylene) nonitol ("TBPMN").

Other embodiments of clarifying agents that may be used include:
 1,3:2,4-dibenzylidenesorbitol
 1,3:2,4-bis(p-methylbenzylidene)sorbitol
 Di(p-methylbenzylidene)Sorbitol
 Di(p-ethylbenzylidene)Sorbitol
 Bis(5',6',7',8'-tetrahydro-2-naphtylidene)Sorbitol In one embodiment, the clarifying agent may also comprise a bisimide, such as benzenetriamine. The clarifying agents described above can be used alone or in combination.

When present in the polymer composition, one or more clarifying agents are generally added in an amount greater than about 200 ppm, such as in an amount greater than about 1,800 ppm, such as in an amount greater than about 2,000 ppm, such as in an amount greater than about 2,200 ppm. One or more clarifying agents are generally present in an amount less than about 5,000 ppm, such as less than about 4,000 ppm, such as less than about 3,000 ppm, such as less than about 2,000 ppm, The amount of clarifying agent present in the composition can depend upon various factors including the type of clarifier that is used.

The first phase polymer and the second phase polymer can be produced using various different polymerization methods and procedures. In one embodiment, a Ziegler-Natta catalyst is used to produce the polymer composition. For example, the olefin polymerization can occur in the presence of a catalyst system that includes a catalyst, an internal electron donor, a cocatalyst, and optionally an external electron donor. Olefins of the formula $CH_2\text{=}CHR$, where R is hydrogen or a hydrocarbon radical with 1 to 12 atoms, can be contacted with the catalyst system under suitable conditions to form the polymer products. Copolymerization may occur in a method-step process in order to generate the heterophasic composition of the present disclosure. The polymerization process can be carried out using known techniques in the gas phase using fluidized bed or stir bed reactors or in a slurry phase using an inert hydrocarbon solvent or diluent or liquid monomer.

In one embodiment, the first phase polymer and the second phase polymer can be produced in a two-stage process that includes a first stage, in which the propylene random copolymer of the continuous polymer phase is prepared, and a second stage, in which the propylene copolymer is produced. The first stage polymerization can be carried out in one or more bulk reactors or in one or more gas phase reactors. The second stage polymerization can be carried out in one or more gas phase reactors. The second stage polymerization is typically carried out directly following the first stage polymerization. For example the polymerization product recovered from the first polymerization stage can be conveyed directly to the second polymerization stage. In this regard, the polymerization may be performed according to a sequential polymerization process. A heterophasic copolymer composition is produced.

In one embodiment of the present disclosure, the polymerizations are carried out in the presence of a stereoregular olefin polymerization catalyst. For example, the catalyst may be a Ziegler-Natta catalyst. For instance, in one embodiment, a catalyst sold under the trade name CONSISTA and commercially available from W. R. Grace & Company can be used. In one embodiment, electron donors are selected that do not contain phthalates.

In one embodiment, the catalyst includes a procatalyst composition that contains a titanium moiety such as titanium chloride, a magnesium moiety such as magnesium chloride, and at least one internal electron donor.

The procatalyst precursor can include (i) magnesium, (ii) a transition metal compound from Periodic Table groups IV-VII, (iii) a halide, an oxylahilde, and or an alkoxide, and/or an alkoxide of (i) or (i) and/or (ii), and (iv) combination of (i), (ii), and (iii). Non limiting examples of suitable procatalyst precursors include halides, oxyhalides, alkoxides of magnesium, manganese, titanium, vanadium, chromium, molybdenum, zirconium, hafnium, and combinations thereof.

In one embodiment, the procatalyst precursor contains magnesium as the sole metal component. Non-limiting examples include anhydrous magnesium chloride and/or its alcohol adduct, magnesium alkoxide, and or aryloxide, mixed magnesium alkoxy halide, and/or carboxylated magnesium dialkoxide or aryloxide.

In one embodiment, the procatalyst precursor is an alcohol adduct of anhydrous magnesium chloride. The anhydrous magnesium chloride adduct is generally defined as $MgCl_2$-nROH where n has a range of 1.5-6.0, preferably 2.5-4.0, and most preferably 2.8-3.5 moles total alcohol. ROH is a $C_1$-$C_4$ alcohol, linear or branched, or mixture of alcohol. Preferably ROH is ethanol or a mixture of ethanol and a higher alcohol. If ROH is a mixture, the mole ratio of ethanol to higher alcohol is at least 80:20, preferably 90:10, and most preferably at least 95:5.

In one embodiment, a substantially spherical $MgCl_2$-nEtOH adduct may be formed by a spray crystallization process. In one, embodiment the spherical $MgCl_2$ precursor has an average particle size (Malvern $d_{50}$) of between about 15-150 microns, preferably between 20-100 microns, and most preferably between 35-85 microns.

In one embodiment, the procatalyst precursor contains a transition metal compound and a magnesium metal compound. The transition metal compound has the general formula $TrX_x$ where Tr is the transition metal, X is a halogen or a $C_{1-10}$ hydrocarboxyl or hydrocarbyl group, and x is the number of such X groups in the compound in combination with a magnesium metal compound. Tr may be a Group IV, V or VI metal. In one embodiment, Tr is a Group IV metal, such as titanium. X may be chloride, bromide, $C_{1-4}$ alkoxide or phenoxide, or a mixture thereof. In one embodiment, X is chloride.

The precursor composition may be prepared by the chlorination of the foregoing mixed magnesium compounds, titanium compounds, or mixtures thereof.

In one embodiment, the precursor composition is a mixed magnesium/titanium compound of the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 56; or 2-4, or 3; f is 2 to 116, or 5 to 15; and g is 0.5 to 116, or 1 to 3.

In accordance with the present disclosure, the above described procatalyst precursor is combined with at least one internal electron donor. The internal electron donor can comprise a substituted phenylene aromatic diester.

In one embodiment, the first internal electron donor comprises a substituted phenylene aromatic diester having the following structure (I):

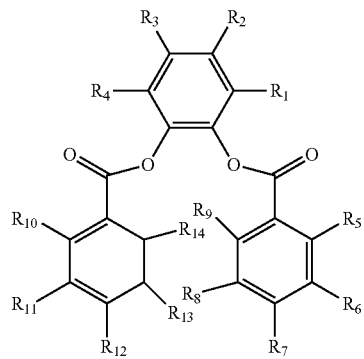

wherein $R_1$-$R_{14}$ are the same or different. Each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one $R_1$-$R_{14}$ is not hydrogen.

In one embodiment, the substituted phenylene aromatic diester may be any substituted phenylene aromatic diester as disclosed in U.S. Patent Application Ser. No. 61/141,959 filed on Dec. 31, 2008, the entire content of which is incorporated by reference herein.

In one embodiment, the substituted phenylene aromatic diester may be any substituted phenylene aromatic diester disclosed in WO12088028, filed on Dec. 20, 2011, the entire content of which is incorporated by reference herein.

In one embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-/intra-cyclic structure may or may not be aromatic. In one embodiment, the inter-/intra-cyclic structure is a $C_5$ or a $C_6$ membered ring.

In one embodiment, at least one of $R_1$-$R_4$ is selected from a substituted hydrocarbyl group having 1 to 20 carbon atoms, an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms. Optionally, $R_1$-$R_4$, and/or $R_5$-$R_9$, and/or $R_{10}$-$R_{14}$ may be linked to form an inter-cyclic structure or an intra-cyclic structure. The inter-cyclic structure and/or the intra-cyclic structure may or may not be aromatic.

In one embodiment, any consecutive R groups in $R_1$-$R_4$, and/or in $R_5$-$R_9$, and/or in $R_{10}$-$R_{14}$, may be members of a $C_5$-$C_6$-membered ring.

In one embodiment, structure (I) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, $R_2$ is selected from a $C_1$-$C_8$ alkyl group, a $C_3$-$C_6$ cycloalkyl, or a substituted $C_3$-$C_6$ cycloalkyl group. $R_2$ can be a methyl group, an ethyl group, a n-propyl group, an isopropyl group, a t-butyl group, an isobutyl group, a sec-butyl group, a 2,4,4-trimethylpentan-2-yl group, a cyclopentyl group, and a cyclohexyl group.

In one embodiment, structure (I) includes $R_2$ that is methyl, and each of $R_5$-$R_{14}$ is hydrogen.

In one embodiment, structure (I) includes $R_2$ that is ethyl, and each of $R_5$-$R_{14}$ is hydrogen.

In one embodiment, structure (I) includes $R_2$ that is t-butyl, and each of $R_5$-$R_{14}$ is hydrogen.

In one embodiment, structure (I) includes $R_2$ that is ethoxycarbonyl, and each of $R_5$-$R_{14}$ is hydrogen.

In one embodiment, structure (I) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ that is methyl, and each of $R_5$-$R_{14}$ is hydrogen.

In one embodiment, structure (I) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ and $R_3$ that are the same or different. Each of $R_1$ and $R_3$ is selected from a $C_1$-$C_8$ alkyl group, a $C_3$-$C_6$ cycloalkyl group, or a substituted $C_3$-$C_6$ cycloalkyl group. $R_5$-$R_{14}$ are the same or different and each of $R_5$-$R_{14}$ is selected from hydrogen, a $C_1$-$C_8$ alkyl group, and a halogen. Nonlimiting examples of suitable $C_1$-$C_8$ alkyl groups include methyl, ethyl, n-propyl, isopropyl, n-butyl, i-butyl, t-butyl, n-pentyl, i-pentyl, neopentyl, t-pentyl, n-hexyl, and 2,4,4-trimethylpentan-2-yl group. Nonlimiting examples of suitable $C_3$-$C_6$ cycloalkyl groups include cyclopentyl and cyclohexyl groups. In a further embodiment, at least one of $R_5$-$R_{14}$ is a $C_1$-$C_8$ alkyl group or a halogen.

In one embodiment, structure (I) includes $R_1$ that is a methyl group and $R_3$ that is a t-butyl group. Each of $R_2$, $R_4$ and $R_5$-$R_{14}$ is hydrogen.

In one embodiment, structure (I) includes $R_1$ and $R_3$ that is an isopropyl group. Each of $R_2$, $R_4$ and $R_5$-$R_{14}$ is hydrogen.

In one embodiment, structure (I) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen.

In one embodiment, structure (I) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen.

In one embodiment, structure (I) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In one embodiment, the substituted phenylene aromatic diester has a structure (II) which includes $R_1$ that is a methyl group and $R_3$ is a t-butyl group. Each of $R_2$ and $R_4$ is hydrogen. $R_8$ and $R_9$ are members of a $C_6$ membered ring to form a 1-naphthoyl moiety. $R_{13}$ and $R_{14}$ are members of a $C_6$ membered ring to form another 1-naphthoyl moiety. Structure (II) is provided below.

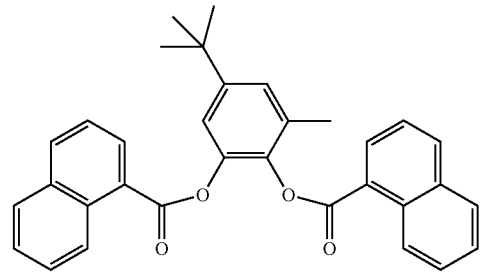 [SMILES: Cc1cc(C(C)(C)C)cc(OC(=O)c2cccc3ccccc23)c1OC(=O)c1cccc2ccccc12]

In one embodiment, the substituted phenylene aromatic diester has a structure (III) which includes $R_1$ that is a methyl group and $R_3$ is a t-butyl group. Each of $R_2$ and $R_4$ is hydrogen. $R_6$ and $R_7$ are members of a $C_6$ membered ring to form a 2-naphthoyl moiety. $R_{12}$ and $R_{13}$ are members of a $C_6$ membered ring to form a 2-naphthoyl moiety. Structure (III) is provided below.

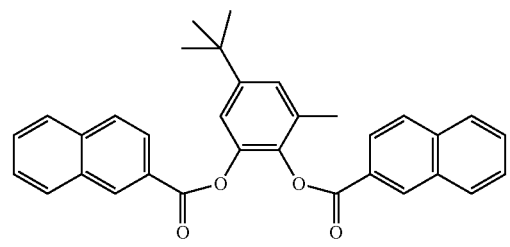 [SMILES: Cc1cc(C(C)(C)C)cc(OC(=O)c2ccc3ccccc3c2)c1OC(=O)c1ccc2ccccc2c1]

In one embodiment, structure (I) includes $R_1$ that is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen.

In one embodiment, structure (I) includes $R_1$ that is a methyl group and $R_3$ is a t-butyl group. Each of $R_6$, $R_8$, $R_{11}$, and $R_{13}$ is a chlorine atom. Each of $R_2$, $R_4$, $R_5$, $R_7$, $R_9$, $R_{10}$, $R_{12}$, and $R_{14}$ is hydrogen.

In one embodiment, structure (I) includes $R_1$ that is a methyl group and $R_3$ is a t-butyl group. Each of $R_2$, $R_4$ and $R_5$-$R_{14}$ is a fluorine atom.

In one embodiment, structure (I) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$ and $R_{14}$ is hydrogen.

In one embodiment, $R_1$ is a methyl group and $R_3$ is a t-butyl group. Each of $R_7$ and $R_{12}$ is an ethoxy group. Each of $R_2$, $R_4$, $R_5$, $R_6$, Ra, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a diethylamino group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a 2,4,4-trimethylpentan-2-yl group. Each of $R_2$, $R_4$ and $R_5$-$R_{14}$ is hydrogen.

In one embodiment, structure (I) includes $R_1$ and $R_3$, each of which is a sec-butyl group. Each of $R_2$, $R_4$ and $R_5$-$R_{14}$ is hydrogen.

In one embodiment, the substituted phenylene aromatic diester has a structure (IV) whereby $R_1$ and $R_2$ are members of a $C_6$ membered ring to form a 1,2-naphthalene moiety. Each of $R_5$-$R_{14}$ is hydrogen. Structure (IV) is provided below.

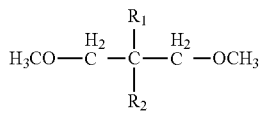

In one embodiment, the substituted phenylene aromatic diester has a structure (V) whereby $R_2$ and $R_3$ are members of a $C_6$ membered ring to form a 2,3-naphthalene moiety. Each of $R_5$-$R_{14}$ is hydrogen. Structure (V) is provided below.

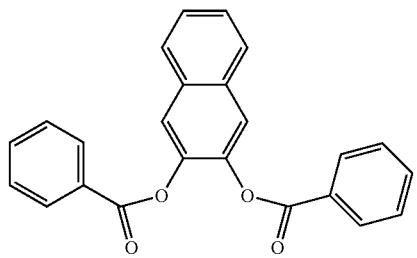 [SMILES: O=C(Oc1cc2ccccc2cc1OC(=O)c1ccccc1)c1ccccc1]

In one embodiment, structure (I) includes $R_1$ and $R_4$ that are each a methyl group. Each of $R_2$, $R_3$, $R_5$-$R_9$ and $R_{10}$-$R_{14}$ is hydrogen.

In one embodiment, structure (I) includes $R_1$ that is a methyl group. $R_4$ is an i-propyl group. Each of $R_2$, $R_3$, $R_5$-$R_9$ and $R_{10}$-$R_{14}$ is hydrogen.

In one embodiment, structure (I) includes $R_1$, $R_3$, and $R_4$, each of which is an i-propyl group. Each of $R_2$, $R_5$-$R_9$ and $R_{10}$-$R_{14}$ is hydrogen.

In one embodiment, each of $R_1$ and $R_4$ is selected from a methyl group, an ethyl group, and a vinyl group. Each of $R_2$ and $R_3$ is selected from hydrogen, a secondary alkyl group, or a tertiary alkyl group, with $R_2$ and $R_3$ not concurrently being hydrogen. Stated differently, when $R_2$ is hydrogen, $R_3$ is not hydrogen (and vice versa).

In one embodiment, a second internal electron donor may be used that generally comprises a polyether that can coordinate in bidentate fashion. In one embodiment the second internal electron donor is a substituted 1,3-diether of structure VI:

$$H_3CO-\underset{H_2}{C}-\underset{R_2}{\overset{R_1}{C}}-\underset{H_2}{C}-OCH_3$$

Where $R_1$ and $R_2$ are the same or different, methyl, $C_2$-$C_{18}$ linear or branched alkyls, $C_3$-$C_{18}$ cycloalkyl, $C_4$-$C_{18}$ cycloalkyl-alkyl, $C_4$-$C_{18}$ alkyl-cycloalkyl, phenyl, organosilicon, $C_7$-$C_{18}$ arylalkyl, or $C_7$-$C_{18}$ alkylaryl radicals; and $R_1$ or $R_2$ may also be a hydrogen atom.

In one embodiment the second internal electron donor may comprise a 1,3-diether with cyclic or polycyclic structure VII:

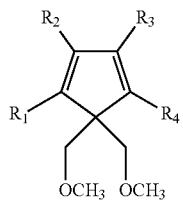

Where $R_1$, $R_2$, $R_3$, and $R_4$ are as described for $R_1$ and $R_2$ of structure VI or may be combined to form one or more $C_5$-$C_7$ fused aromatic or non-aromatic ring structures, optionally containing an N, O, or S heteroatom. Particular examples of the second internal electron donor include 4,4-bis(methoxymethyl)-2,6-dimethyl heptane, 9,9-bis(methoxymethyl)fluorene, or mixtures thereof.

The precursor is converted to a solid procatalyst by further reaction (halogenation) with an inorganic halide compound, preferably a titanium halide compound, and incorporation of the internal electron donors.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride.

The resulting procatalyst composition can generally contain titanium in an amount from about 0.5% to about 6% by weight, such as from about 1.5% to about 5% by weight, such as from about 2% to about 4% by weight. The solid catalyst can contain magnesium generally in an amount greater than about 5% by weight, such as in an amount greater than about 8% by weight, such as in an amount greater than about 10% by weight, such as in an amount greater than about 12% by weight, such as in an amount greater than about 14% by weight, such as in an amount greater than about 16% by weight. Magnesium is contained in the catalyst in an amount less than about 25% by weight, such as in an amount less than about 23% by weight, such as in an amount less than about 20% by weight. The internal electron donor can be present in the catalyst composition in an amount less than about 30% by weight, such as in an amount less than about 25% by weight, such as in an amount less than about 22% by weight, such as in an amount less than about 20% by weight, such as in an amount less than about 19% by weight. The internal electron donor is generally present in an amount greater than about 5% by weight, such as in an amount greater than about 9% by weight.

In one embodiment, the procatalyst composition is combined with a cocatalyst to form a catalyst system. A catalyst system is a system that forms an olefin-based polymer when contacted with an olefin under polymerization conditions. The catalyst system may optionally include an external electron donor, an activity limiting agent, and/or various other components.

As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In one embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum. In one embodiment, preferred cocatalysts are selected from triethylaluminum, triisobutylaluminum, tri-n-hexylaluminum, diisobutylaluminum hydride, and di-n-hexylaluminum hydride, and most preferred cocatalyst is triethylaluminum.

In one embodiment, the cocatalyst is a hydrocarbyl aluminum compound represented by the formula $R_nAlX_{3-n}$ wherein n=1 or 2, R is an alkyl, and X is a halide or alkoxide. Nonlimiting examples of suitable compounds are as follows: methylaluminoxane, isobutylaluminoxane, diethylaluminum ethoxide, diisobutylaluminum chloride, tetraethyldialumoxane, tetraisobutyldialuminoxane, diethylaluminum chloride, ethylaluminum dichloride, methylaluminum dichloride, and dimethylaluminum chloride.

In one embodiment, the catalyst composition includes an external electron donor. As used herein, an "external electron donor" is a compound added independent of procatalyst formation and contains at least one functional group that is capable of donating a pair of electrons to a metal atom. Bounded by no particular theory, it is believed that the external electron donor enhances catalyst stereoselectivity, (i.e., to reduces xylene soluble material in the formant polymer).

In one embodiment, the external electron donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In one embodiment, the external electron donor is an alkoxysilane. The alkoxysilane has the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R' containing up to 20 atoms not counting hydrogen and halogen; R' is a $C_{1-4}$ alkyl group; and m is 0, 1, 2 or 3. In an embodiment, R is $C_{6-12}$ aryl, alkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In one embodiment, the silane composition is dicyclopentyldimethoxysilane (DCPDMS), methylcyclohexyldimethoxysilane (MChDMS), diisopropyldimethoxysilane (DIPDMS), n-propyltrimethoxysilane (NPTMS), diethylaminotriethoxysilane (DATES), or n-propyltriethoxysilane (PTES), and any combination of thereof.

In one embodiment, the external donor can be a mixture of at least 2 alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In one embodiment, the external electron donor is selected from one or more of the following: a benzoate, and/or a diol ester. In another embodiment, the external electron donor is 2,2,6,6-tetramethylpiperidine. In still another embodiment, the external electron donor is a diether.

In one embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), poly(alkene glycol)ester, a diol ester, and combinations thereof. The carboxylic acid ester can be an aliphatic or aromatic, mono- or poly-carboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate and propyl pivalate.

In one embodiment, the external electron donor and/or activity limiting agent can be added into the reactor separately. In another embodiment, the external electron donor and the activity limiting agent can be mixed together in advance and then added into the reactor as a mixture. In the mixture, more than one external electron donor or more than one activity limiting agent can be used. In one embodiment, the mixture is dicyclopentyldimethoxysilane and isopropyl myristate, dicyclopentyldiniethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane, isopropyl myristate, pentyl valerate, and combinations thereof.

In one embodiment, the catalyst composition includes any of the foregoing external electron donors in combination with any of the foregoing activity limiting agents.

The catalyst system as described above has been found to be particularly well suited for producing the heterophasic polymer composition of the present disclosure.

Due to the physical properties of the polypropylene composition of the present disclosure, especially the flow properties of the composition, the composition is well suited to producing molded articles. The polypropylene composition, for instance, can be used in injection molding, blow molding, and rotational molding applications.

The polypropylene polymer composition of the present disclosure can be used to make numerous and diverse articles and products. Due to the polymer composition having high transparency properties in combination with excellent impact resistance properties, the polymer composition is particularly well suited to producing storage containers. The storage container, for instance, may be food packaging. Due to the impact resistance properties of the polymer, the storage container, for instance, can be used to place food items in a freezer. Referring to FIG. 1, for instance, one embodiment of a storage container made in accordance with the present disclosure is shown. As illustrated, the storage container 10 includes a container portion 14 that defines a hollow interior for receiving one or more items. The container portion 14 can be matched to a lid 12. The lid 12 can include a channel and flange that interlocks with a rim of the container portion 14. In accordance with the present disclosure, the contents of the container 10 can be viewed through the walls of the container.

In addition to food containers, various other storage containers can be made in accordance with the present disclosure. For instance, larger storage containers can be made using the polymer composition of the present disclosure. The larger storage containers for instance, can be designed for storing different items in an attic, garage or other storage facility where temperature swings can occur.

The present disclosure may be better understood with reference to the following examples.

EXAMPLES

Two different heterophasic polypropylene copolymer samples were produced in accordance with the present disclosure and tested for various properties including impact strength and haze. A comparative example was also produced containing lower amounts of ethylene in the second phase polymer. The heterophasic copolymers were made generally using the process described above in conjunction with the catalyst described above. In particular, the copolymers were made in a dual reactor setup where the matrix polymer was made in a first gas phase reactor and then the contents of the first reactor were passed to a second gas phase reactor. Ethylene was used as the comonomer. Ethylene content was controlled in the first phase polymer and the second phase polymer.

Polymer pellet samples were produced that were injected molded into specimens. An additive package was added to the polymer which included 1000 ppm of pentaerythritol tetrakis(3-(3,5-di-tert-butyl-4-hydroxyphenyl)propionate); 1000 ppm of tris(2,4-ditert-butylphenyl)phosphite; 180 ppm of an acid scavenger (hydrotalcite); 2000 ppm of glycerol monostearate; and 4000 ppm of a clarifying agent. For instance, the specimens were made according to ASTM Test D4101 to produce specimens for flex and IZOD Testing.

The following are the polymerization conditions for the three samples. Gas phase reactors were used to produce the polymers.

|  | Sample No. 1 | Sample No. 2 | Sample No. 3 |
|---|---|---|---|
| Reactor 1 | | | |
| Temperature ° C. | 72 | 65 | 65 |
| Catalyst Al/Ti | 49 | 35 | 35 |
| Residence time, hr | 2.8 | 1.7 | 1.1 |
| Reactor 2 | | | |
| Temperature ° C. | 65 | 65 | 65 |
| Catalyst Residence time | 3.1 | 2.8 | 1.8 |

The following polypropylene compositions were produced:

|  | Sample No. 1 | Sample No. 2 | Sample No. 3 |
|---|---|---|---|
| First Polymer Phase | | | |
| MFR1, g/10 min | 44 | 37 | 26 |
| XS1, % | 1.5 | 6 | 6 |
| First and Second Polymer Phases | | | |
| MFR2, g/10 min | 16 | 18 | 21 |
| XS2, % | 30 | 18.4 | 19.2 |
| Ethylene in XS, % | 42 | 65.2 | 61.8 |
| Ethylene in XI, % | — | 36 | 22 |
| Koenig's B-value of XS | 0.9 | 0.7 | 0.75 |
| Koenig's B-value of XI | — | 0.15 | 0.19 |

The above compositions were tested for various properties. The following results were obtained:

|  | Sample No. 1 | Sample No. 2 | Sample No. 3 |
|---|---|---|---|
| Flexural Modulus, MPa | 970 | 708 | 721 |
| Gardner at 0 C., inch-lbs | 300 | 227 | 246 |
| Gardner at −20 C., inch-lbs | 230 | 338 | 374 |
| Haze at 1 mm, % | >99 | 42 | 21 |
| Clarity at 1 mm, % | <50 | 92 | 98 |
| Tan δ peak, ° C. | −45, 0 | −105, −40, 5 | −100, −45, 5 |
| Crystallinity ratio | <3 | 58.3 | 42.3 |
| Average particle size | 1.2 | 3.4 | 2.2 |

Sample No. 2 and Sample No. 3 above were made in accordance with the present disclosure. These samples displayed dramatically better impact resistance properties at a temperature of −20° C.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polypropylene composition comprising:
a first polymer phase comprising a polypropylene polymer, the polypropylene polymer having a xylene soluble content of less than about 10% by weight and having a melt flow rate of from about 20 g/10 min to about 50 g/10 min;
a second polymer phase combined with the first polymer phase, the second polymer phase comprising a propylene and alpha olefin copolymer; and
wherein the polypropylene composition has a melt flow rate of 3 g/10 min or greater, and wherein the ratio of the melt flow rate of the first polymer phase to the melt flow rate of the polypropylene composition is greater than or equal to 1, the polypropylene composition having a xylene soluble portion and a xylene insoluble portion, the polypropylene composition having a total xylene soluble content of from about 12% to about 25% by weight, the xylene soluble portion containing the alpha olefin in an amount from about 55% to about 70% by weight, the xylene insoluble portion containing the alpha olefin in an amount from about 15% to about 40% by weight, the polypropylene composition having a Gardner impact strength at −20° C. of greater than about 200 inch-lbs.

2. A polypropylene composition as defined in claim 1, wherein the composition further contains a clarifier and wherein the polypropylene composition has a haze at 1 mm of less than about 45%.

3. A polypropylene composition as defined in claim 1, wherein the second polymer phase is in the form of polymer particles dispersed within the first polymer phase, the polymer particles having an average particle size of greater than or equal to about 1 micron.

4. A polypropylene composition as defined in claim 1, wherein the polypropylene polymer contained in the first polymer phase comprises a polypropylene random copolymer containing ethylene and wherein the second polymer phase comprises a propylene ethylene copolymer.

5. A polypropylene composition as defined in claim 4, wherein the ethylene content in the xylene soluble portion of the polypropylene composition is from about 60% to about 70% by weight.

6. A polypropylene composition as defined in claim 4, wherein the ethylene content in the xylene insoluble portion of the polypropylene composition is from about 20% to about 38% by weight.

7. A polypropylene composition as defined in claim 1, wherein the composition has a flexural modulus of from about 500 MPa to about 1000 MPa.

8. A polypropylene composition as defined in claim 1, wherein the composition has a Gardner impact strength at −20° ° C. of from about 300 inch-lbs to about 500 inch-lbs.

9. A polypropylene composition as defined in claim 4, wherein the polypropylene random copolymer in the first polymer phase contains ethylene in an amount from about 1% to about 4% by weight.

10. A polypropylene composition as defined in claim 4, wherein the propylene ethylene copolymer in the second polymer phase contains ethylene in an amount of greater than about 75% by weight, such as in an amount greater than about 80% by weight.

11. A polypropylene composition as defined in claim 1, wherein the second polymer phase is present in the polypropylene composition in an amount from about 15% to about 50% by weight.

12. A polypropylene composition as defined in claim 1, wherein the polypropylene composition has a total xylene soluble content of from about 15% to about 21% by weight.

13. A polypropylene composition as defined in claim 1, wherein the polypropylene composition has a haze at 1 mm of from about 15% to about 45%.

14. A polypropylene composition as defined in claim 1, wherein the polypropylene composition has a clarity of greater than about 90%, such as greater than about 92%.

15. A polypropylene composition as defined in claim 1, wherein the polypropylene composition has a melt flow rate of from about 15 g/10 min to about 30 g/10 min.

16. A polypropylene composition as defined in claim 1, wherein the second polymer phase is formed in the presence of the first polymer phase.

17. A polypropylene composition as defined in claim 1, wherein the polypropylene composition exhibits at least three tan delta peaks at three different temperatures.

18. A polypropylene composition as defined in claim 1, wherein the composition further contains an antacid and an antioxidant.

19. A molded article formed from the polypropylene composition as defined in claim 1.

20. A molded article as defined in claim 19, wherein the molded article is an injection molded article.

* * * * *